Sept. 19, 1933.  M. W. BARDWELL  1,927,383
PORTABLE POWER DRIVEN WRENCH
Filed Nov. 24, 1931  2 Sheets-Sheet 2
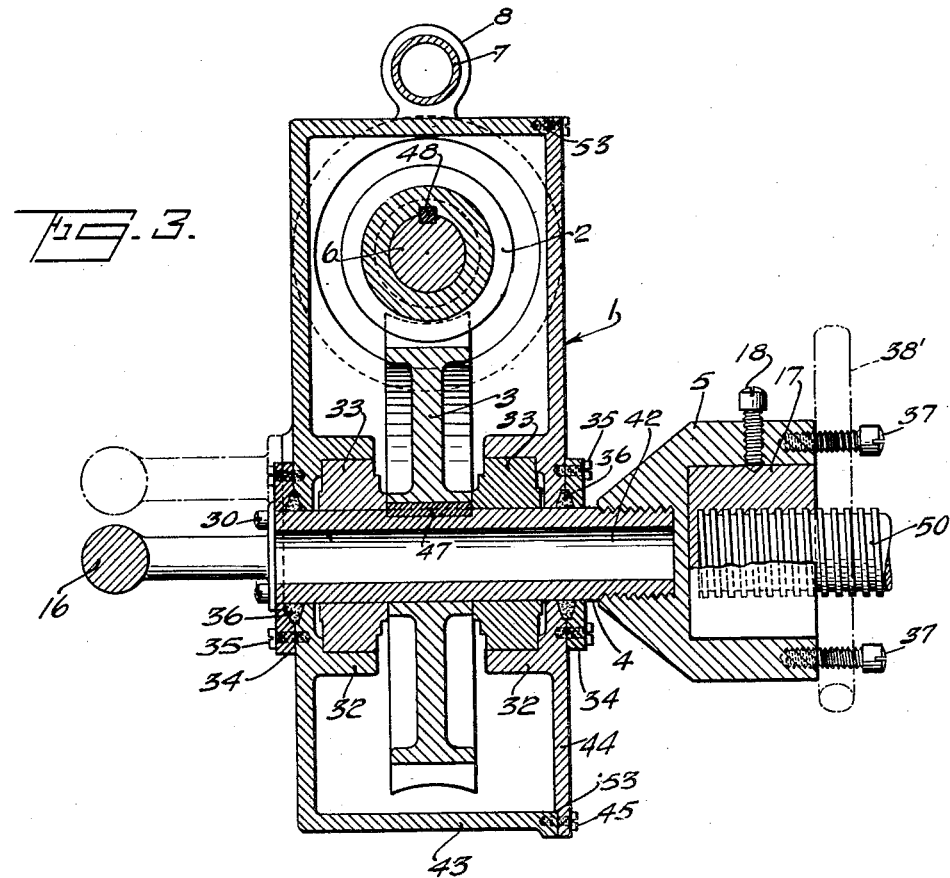
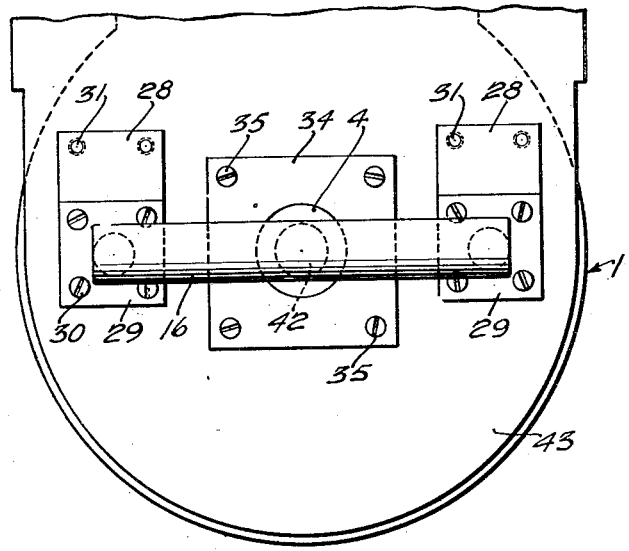
INVENTOR
Martin W. Bardwell.
BY
ATTORNEY Patented Sept. 19, 1933

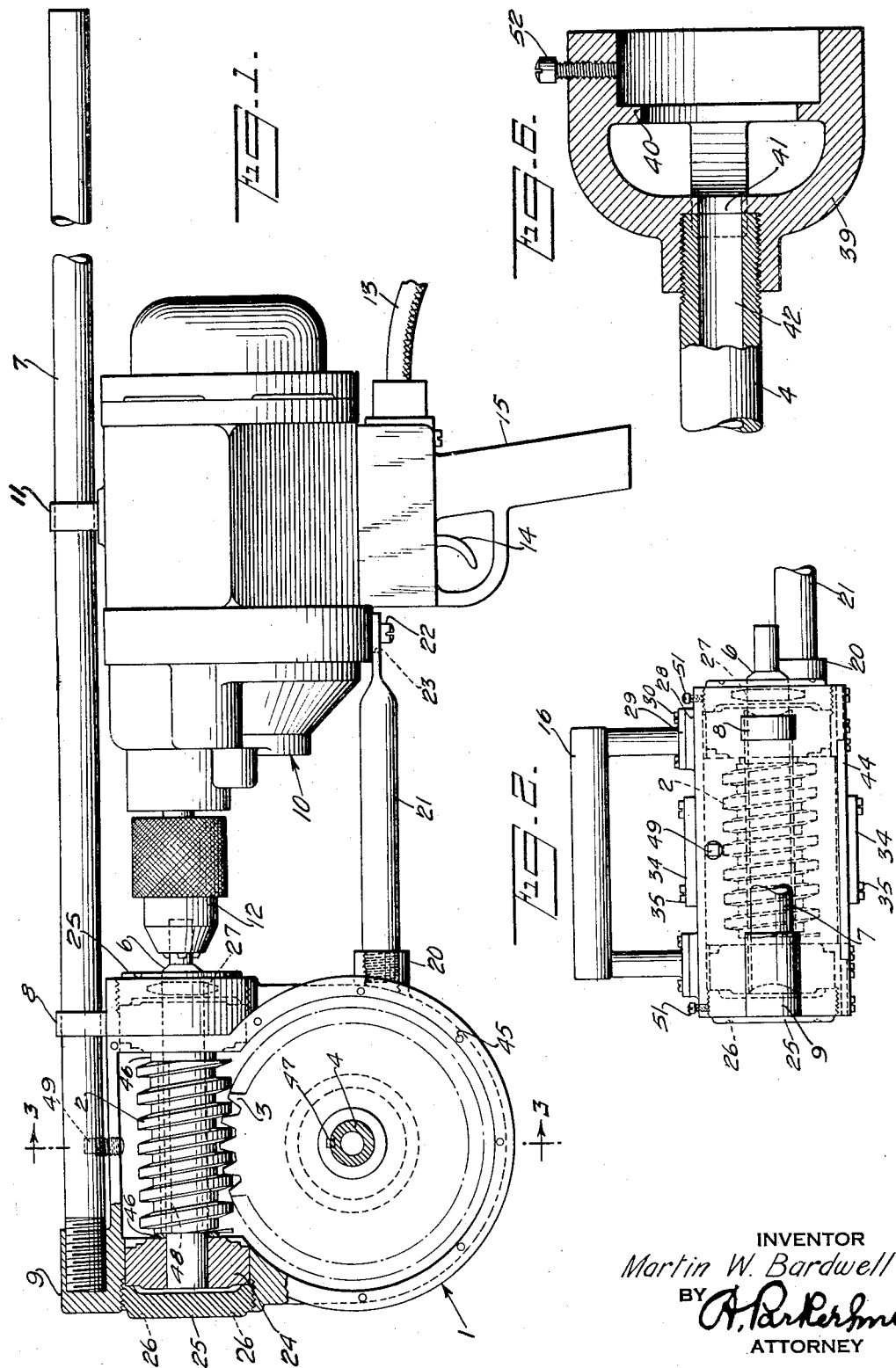

1,927,383

UNITED STATES PATENT OFFICE 1,927,383

PORTABLE POWER-DRIVEN WRENCH

Martin W. Bardwell, Syracuse, N. Y.

Application November 24, 1931
Serial No. 576,970

6 Claims. (Cl. 81—57)

This invention relates generally to portable, self-contained encased gearing adapted to be set in motion by an attached motor, and to then transmit said motion at a reduced speed to a bolt or nut or die or other object which must be given rotation against a resistance greater than the motor could overcome if directly connected to said object. Specifically the present invention is designed to screw into trees the long, threaded rods used for supporting sagging limbs and otherwise binding together parts of trees for mutual support, but it can be used to advantage in driving home such long lag-screws in ships, bridges, or other wooden structures, or in screwing up bolts and nuts in assembly work in manufacturing plants, or in cutting threads on pipes, rods and bolts and in bolt holes in plumbing work, and in other similar operations where the machine must be carried to the work, instead of chucking the work in stationary power-driven apparatus such as lathes, drill presses, etc. as is ordinarily done. The apparatus as herein shown is primarily designed to be used with standard makes of portable electric motors now on the market, but it could, of course, be driven by a compressed air motor, flexible shafting, or other forms of portable power generating units.

The best form of apparatus embodying my invention at present known to me is illustrated in the accompanying two sheets of drawings in which Fig. 1 is a side elevation of the apparatus with parts broken away and others shown in section.

Fig. 2 is a partial plan view with parts omitted.

Fig. 3 is a vertical cross section on line 3—3 of Fig. 1.

Fig. 4 is a rear elevation of the gear case with parts broken away.

Fig. 5 is a face view of one form of chuck for use on the apparatus, and

Fig. 6 is an axial section of another form.

Throughout the drawings like reference characters indicate like parts. In substance the construction shown comprises an efficient form of worm gearing enclosed in a convenient portable casing, which gearing has shafts projecting through said casing, to one of which shafts a portable power unit such as an electric motor may be clutched for driving the gearing, and to the other of which a suitable chuck may be attached for holding the bolt or nut or other article to be rotated by the motion transmitted from the motor, the parts being so arranged that the motor can be conveniently connected or disconnected from the gearing, the apparatus readily connected to and disconnected from the bolt or other object to be rotated, and the apparatus easily held by the operator and the torsional forces generated by its operation resisted with slight effort.

Referring to the drawings, 1 represents generally the casing for a set of worm gearing comprising the worm wheel 3, said casing having its main body cylindrical in form to receive said worm wheel and an offset portion of tubular form extending at right angles to the axis of the first mentioned portion and adapted to receive the worm which meshes with said worm wheel. As shown, the casing comprises the main body portion 43, with the cover plate 44 for one side thereof, these parts being held thereto by screws 45. Preferably plate 44 has a $\frac{1}{32}$ inch inset 53 around its edge (see Fig. 3) so as to make an oil tight joint and prevent any sliding laterally if screws 45 get loose. This also ensures proper alinement of shaft 4. The worm wheel 3 is mounted on the shaft 4 which is preferably made hollow, as shown, and locked to said shaft by key 47, which preferably has a length just equal to the width of the hub of worm gear 3 and is set in a keyway of the same length in shaft 4. Consequently said key 47 also serves as a means for preventing any endwise play of shaft 4. This shaft 4 is journalled in annular bearings 33, 33, which are held in annular flanges 32, 32, cast on the casing body 43, and cover plate 44 respectively. 34, 34, are gland plates held to the exterior casing walls by screws 35, 35, the interior edges of the said plates and said casing walls which surround shaft 4 being oppositely cut away to form an annular chamber for holding packing which is of a truncated V-shaped cross section. 36, 36, are packing rings of compressible material having a similar truncated V-shaped cross section and adapted to fit in said recesses, but of a thickness greater than necessary to fill said recesses. As a result, when said over-sized packings are compressed by screwing down the gland plates 34, 34, said packing will be forced closely against the surface of the shaft 4 in directions radial thereto and so prevent the oil which has been poured into the casing interior through the oil hole closed by screw plug 49 from escaping therefrom around said protruding shaft ends.

Worm 2 is preferably made hollow and supported on shaft 6, being fastened thereto by key 48. Shaft 6 rotates in annular journal bearings 24, 24, which slip into either end of the tubular portion of casing 1, as shown in Figs. 1 and 2, and these journal bearings are held in place and adjusted inwardly by the threaded end plates 25, 25, which screw into the ends of the tubular portion of the casing. 26, 26, represent holes in the outer faces of said plates with which a suitable spanner may engage for rotating them. These end plates may be held in any position of adjustment by radial set screws 51, 51 (see Fig. 2). Preferably washers 46, 46, are inserted between the ends of the worm 2 and the journal bearings 24, 24, and the screw plates 25, 25, preferably have annular lips formed on the inner surfaces adapted to bear on the adjacent surfaces of the journal bearings 24, so that when either of said plates 25 is screwed inwardly it will evenly press the journal bearings, washers and worm together to the desired extent to take up any back lash and properly adjust the worm with reference to the teeth on worm wheel 3. This form of end plates also produces narrow oil chambers at or around either end of the worm shaft, as shown in Figs. 1 and 2, in which chambers surplus oil escaping from the journal bearing can collect and serve as an auxiliary lubricating means when the liquid level therein is high enough. The cored out portions of casing 43 and cover plate 44 within flanges 32, 32, serve a similar purpose for shaft 4 (see Fig. 3).

7 is a member fixed to the exterior of the gear casing 1, and extending in a plane at right angles to the worm wheel shaft 4, serving in effect as a wrench handle, the casing and contained gear forming the wrench head, and the chuck 5 (Fig. 3) or 39 (Fig. 6) mounted on the projecting end of worm wheel shaft 4 serving as the jaws of the wrench. Preferably, as shown, this projecting member 7 is a simple piece of gas pipe with one end passing through the screw eye 8 and being screwed into the threaded socket 9, both of which are set in the top of casing 1, or formed integrally therewith.

10 represents generally a small electric motor of the type which usually has in the upper part of its casing a small tapped opening into which a handle or other attachment can be screwed. Into this opening in the casing the screw eye 11 has been screwed, the eye of said screw being of just sufficient interior diameter to slip over the wrench handle 7. The usual screw chuck 12 is mounted on the projecting end of the driving shaft of electric motor 10, said chuck being adapted to be clamped to the reduced end of the worm shaft 6 projecting from casing 1 when motor 10 is slid up into the position shown in Fig. 1, though any other desired form or chuck or coupling could be substituted.

Usually the screw eye 11 engaging the wrench handle 7 presents sufficient resistance to the side torque produced by the driving action of the motor rotation on the shaft 6 but, if additional resistance to any such twisting action is required, the stud 21 may be screwed into the threaded socket 20 on the gear casing, and its outer end connected to the motor by setscrew 22. Preferably the end of stud 21 is slotted, as indicated at 23, so that the setscrew 22, when not screwed down on the flattened end of the stud, may slide in and out of said slot as the motor is slid along on the wrench handle 7 for engagement or disengagement with worm shaft 6, as above explained.

13 represents a portion of the cable through which current is supplied to motor 10, the casing of which has a pistol grip 15, and a projecting trigger switch 14 for controlling the said current.

16 is an additional handle attached to the back of the gear casing 1, by means of the feet 29 screwed to bosses 28 cast on the back of the casing, as indicated at 30, 30. Preferably these bosses are extended and provided with extra sets of screw holes 31 so that the handle may be fastened to the casing in the broken line position shown in Fig. 3 to place the handle 16 out of line with the bore 42 of worm shaft 4 when so desired.

5 is the form of chuck to be screwed onto the projecting end of shaft 4 or otherwise mounted thereon when the long threaded bolts or rods for use in tree surgery are to be screwed in by the use of my invention. One end of such threaded rod is indicated at 50 in Fig. 3. It is screwed into the cup-shaped nut 17 which is set in a recess in the face of chuck 5 and held there releasably by setscrew 18. This recess in the chuck is square in cross section, as shown, but might be of any other polygonal outline to correspond to the exterior shape of the nut used. When the chuck is rotated in clockwise direction, the nut 17 will be screwed onto the end of rod 50 until the rod end is jammed against the bottom of the cup-shaped recess in said nut and thereafter rotation of the chuck will also rotate the rod. After the rod has been thus screwed into the tree, the state of strain existing between the protruding end of the rod and the nut 17 can be relieved by giving the whole wrench structure a slight backward turn, the operator doing this by means of wrench handle 7. As a result, when the setscrew 18 is backed off and the chuck pulled off the nut 17, leaving it on the end of the rod, it can then be disengaged rapidly by the operator unscrewing it by hand, instead of his being compelled to rotate the entire wrench structure for such purpose.

37, 37, are screws set in the face of the chuck 5 so that a rod or bar 38 can be placed between them, as shown in Fig. 5, and used as a lever for screwing the chuck firmly onto or off the end of the shaft 4 of the worm wheel. The worm gearing is, of course, irreversible, and therefore it automatically locks and holds the shaft 4 against rotation when this is being done. This irreversibility also locks the gearing parts together and compels the chuck to turn with the casing 1 and wrench handle 7 if and when the entire apparatus is thus manually operated as a wrench.

Obviously any proper set of thread cutting dies could be substituted for the nut 17 in chuck 5 and used for cutting threads on pipe ends or bolt ends. A special form of skeleton chuck 39, designed for this purpose, is, however, shown in Fig. 6, which has a central perforation 41 in line with the bore 42 of shaft 4 so that a long rod can be fed into said bore 42 while a thread is being cut along the entire surface of such rod, or along any considerable portion thereof. 40 is an annular rib in the chuck interior for holding the dies some distance from the inner end of the chuck, thus leaving the openings in the skeleton portion of said chuck uncovered so that the chips and shavings produced by the cutting action of the dies may escape freely through said openings. 52 is a setscrew for holding the screw-cutting dies (not shown) in the chuck.

The method of operating the invention may be generally outlined as follows: When used in tree surgery and similar work, on lag-screws or threaded rods 50 having no heads, the motor is slid off of projecting member or handle 7, a suitable auger or other boring tool clamped in clutch 12, and the motor 10 operated to bore the hole. The auger is then removed from the hole, the motor freed from the auger, slid back into position on member 7, and clutched to worm shaft 6, as shown in Fig. 1. The nut 17 is then screwed onto the end of a threaded rod 50, either by hand or by fastening it in chuck 5 by setscrew 18 and starting the motor. The other end of the rod is then inserted in the hole bored for it as above described and, the motor rotating, the end of rod 50 soon becomes jammed against the bottom of the cup-shaped recess in nut 17 so that thereafter the rod turns with it and is thus rapidly screwed into the hole in the tree or other object being operated on. When this operation has been completed the whole wrench structure is manually given a backward turn as a unit by the operator by means of handle 7 so that the end of the rod 50 is thereby freed from contact with the bottom of the cup-shaped recess in nut 17, and the setscrew 18 can then be backed off by hand to free said nut 17 so that the rest of the chuck can be disconnected from the nut and the latter unscrewed by hand and an ordinary nut substituted and screwed down against the bark of the tree, if desired, or the protruding end of the rod left free.

During the operation above described the handle 16 is preferably located in the position shown in full lines in Fig. 3, so that the pressure of the operator's hand on it will be exerted in the line of the axis of rod 50 and no bending strain impressed on the chuck or rod.

When the thread cutting chuck 39 is being used, however, on rods or pipes long enough to extend through the entire bore 42 of shaft 4 before the operation is completed, handle 16 should be shifted to the position shown in broken lines so as to clear the end of whatever long article is then being operated on when such end begins to protrude from that side of the casing.

When bolts having heads, or nuts, are to be screwed into position in assembly work, nut 17 is removed from chuck 5 and the bolt head or nut grasped directly by the cup-shaped recess in 5, acting as a socket wrench, or such bolt or nut is otherwise chucked therein.

Various changes could be made in the details of the apparatus above described as the preferred embodiment of my invention, and certain elements of the entire combination omitted in special cases, without departing from the underlying principles of the invention, as herein explained and more particularly pointed out in the appended claims. Thus other forms of speed reducing and torque increasing gearing could be substituted for the worm gearing here shown, the shaft 4 might be made solid, and other forms of chuck might be employed. Also some of the minor novel details described might be omitted without entirely destroying the advantageous character of the still remaining sub combinations.

Having described my invention, I claim:

1. In a portable power driven apparatus, the combination of a worm gearing, a casing therefor from which an end of the worm wheel shaft and an end of the worm shaft project, a chuck mounted on the projecting end of said worm wheel shaft, a relatively long bar fastened at one end to the exterior of said casing in a position substantially parallel to the worm shaft and projecting a major portion of its length beyond the above mentioned projecting end of said worm shaft, a motor slidingly mounted on and beside the projecting portion of said bar, the free end of which projects beyond said motor, and releasable coupling means for connecting said motor to the projecting end of said worm shaft when the two are placed in juxtaposition by sliding said motor along said bar.

2. A combination such as defined in claim 1 in which said casing is provided with an exterior perforated lug and in which said projecting member consists of a rod removably mounted in said lug.

3. An apparatus such as defined in claim 1 combined with a member projecting from said casing and adapted to engage said motor at another point to further resist torsional strains produced by its rotation.

4. A structure such as defined in claim 1 combined with a handle fixed to the exterior of said casing on the side thereof opposite to that on which said chuck is located.

5. A combination such as defined in claim 1 in which said member projecting from said casing comprises a straight rod on which a perforated lug on the exterior of said motor is adapted to slide.

6. In a portable power driven apparatus for rotating screw threaded rods, the combination, with a casing, an irreversible train of gearing therein and a shaft adapted to be rotated by said gearing, and a motor detachably coupled to said gearing, of a chuck mounted on the end of said shaft having an interior recess of polygonal outline in cross section, and a cup-shaped nut adapted to be screwed on the end of said threaded rod and to fit loosely into said chuck interior and be rotated thereby, together with a handle bar extending from said casing substantially at right angles to said shaft, having its free end projecting along and beyond said motor and serving as a lever, both for holding the casing against rotation during normal operation and for manually rotating the entire apparatus in an opposite direction to free the chuck, whereby rotation of said chuck and nut in one direction will jam the end of the rod against the bottom of the cup-shaped recess in the nut and thereafter cause said rod to rotate, but a reversed rotation of said casing and chuck will free the rod end from contact with the bottom of the cup-shaped recess in said nut, thereby permitting said nut to be easily released from said rod after the chuck has been pulled away from it, leaving it on the end of the rod.

MARTIN W. BARDWELL.